(12) United States Patent
Haro et al.

(10) Patent No.: US 9,392,412 B2
(45) Date of Patent: Jul. 12, 2016

(54) APPARATUS AND METHOD OF DETERMINING A LIFE CHANGE OF A USER OF A MOBILE DEVICE BASED ON BEHAVIORAL ABNORMALITY

(71) Applicant: Life360, Inc., San Francisco, CA (US)

(72) Inventors: Alexander Haro, San Francisco, CA (US); Christopher Hulls, Point Reyes, CA (US); Michael Borsuk, San Francisco, CA (US); Michael Hood, San Francisco, CA (US)

(73) Assignee: LIFE360, INC., San Francisco, CA (US)

( * ) Notice: Subject to any disclaimer, the term of this patent is extended or adjusted under 35 U.S.C. 154(b) by 0 days.

(21) Appl. No.: 14/193,840

(22) Filed: Feb. 28, 2014

(65) Prior Publication Data

US 2015/0249905 A1 Sep. 3, 2015

(51) Int. Cl.
*H04W 4/02* (2009.01)

(52) U.S. Cl.
CPC .............. *H04W 4/025* (2013.01); *H04W 4/028* (2013.01)

(58) Field of Classification Search
USPC ............................................. 455/456.1–457
See application file for complete search history.

(56) References Cited

U.S. PATENT DOCUMENTS

| | | | |
|---|---|---|---|
| 7,036,094 B1 | 4/2006 | Cohen et al. | |
| 7,720,855 B2 | 5/2010 | Brown | |
| 7,849,033 B2 | 12/2010 | Sabe et al. | |
| 7,895,049 B2 | 2/2011 | O'Sullivan et al. | |
| 8,269,834 B2 | 9/2012 | Albertson et al. | |
| 8,407,625 B2 | 3/2013 | Cohen et al. | |
| 8,504,180 B2 | 8/2013 | Imes et al. | |
| 8,566,272 B2 | 10/2013 | Fukumoto et al. | |
| 8,666,373 B2 | 3/2014 | Dessouky et al. | |

(Continued)

OTHER PUBLICATIONS

Human Behaviour Analysis Using Data Collected from Mobile Devices 1Muhammad Awais Azam, 1Jonathan Loo, 1Sardar Kashif Ashraf Khan, 2Muhammad Adeel, 3Waleed Ejaz Human Behaviour Analysis Using Data Collected from Mobile Devices 2012,International Journal on Advances in Life Sciences, vol. 4 No. 1 & 2, year 2012—pp. 1,3 and 5.*

(Continued)

*Primary Examiner* — Marisol Figueroa
(74) *Attorney, Agent, or Firm* — Blakely Sokoloff Taylor & Zafman LLP

(57) ABSTRACT

Method of determining user's life change based on behavioral abnormality starts with processor receiving first location data and first proximity information from first mobile device. First proximity information includes identification of mobile devices within proximity sensitivity radius of first mobile device. Processor determines whether first location data and first proximity information are included in historical location data and historical proximity information, respectively, associated with first mobile device. When first location data and first proximity information is not included, processor determines whether subsequent location data and subsequent proximity information received from first mobile device over predetermined time period is included. Processor signals to monitor life change of user of first mobile device when subsequent location data and subsequent proximity information received from first mobile device over predetermined time period is not included in historical location data and historical proximity information, respectively, associated with first mobile device. Other embodiments are described.

20 Claims, 5 Drawing Sheets

(56) References Cited

U.S. PATENT DOCUMENTS

| | | | |
|---|---|---|---|
| 2009/0254975 A1* | 10/2009 | Turnbull | H04L 63/0492 726/3 |
| 2010/0203901 A1* | 8/2010 | Dinoff | H04W 4/022 455/456.3 |
| 2011/0238755 A1 | 9/2011 | Khan et al. | |
| 2012/0278387 A1* | 11/2012 | Garcia et al. | 709/204 |
| 2013/0085861 A1* | 4/2013 | Dunlap | 705/14.58 |
| 2013/0110641 A1 | 5/2013 | Ormont et al. | |
| 2013/0232201 A1* | 9/2013 | Jennings | H04W 4/02 709/204 |
| 2013/0260795 A1* | 10/2013 | Papakipos et al. | 455/456.3 |
| 2014/0221012 A1* | 8/2014 | Uetabira | H04W 4/028 455/456.3 |
| 2015/0262435 A1* | 9/2015 | Delong | G07C 5/0816 340/439 |

OTHER PUBLICATIONS

Notification of Transmittal of the International Search Report and the Written Opinion of the International Searching Authority, or the Declaration mailed May 28, 2015 for International Application No. PCCT/US2015/017338.

* cited by examiner

APPARATUS AND METHOD OF DETERMINING A LIFE CHANGE OF A USER OF A MOBILE DEVICE BASED ON BEHAVIORAL ABNORMALITY

FIELD

The invention relates to system and method for use in identifying life changes of users of mobile devices using identified behavior changes of the mobile devices; and more specifically use of changes of behavior of a mobile device, from the normal behavior identified using stored data of group associations, proximity identification, and location identification of the mobile device, to determine and recognize possible life changes of the user of the mobile device.

BACKGROUND

The prolific growth of cell phones and other mobile devices like iPads and other mobile communication devices, in recent years, have increased the use of these devices in daily lives of the individual users. These devices find use mainly in entertainment, commerce and financial transaction areas. In practice it has been shown that the mobile devices are mostly associated with an individual and have characteristics, properties and preferences that are unique to the individual owner of the mobile device. This linking of the individual user with specific mobile devices has created a number of opportunities to understand the individual's preferences characteristics. This preference characteristic has been used for identifying the behavior and choices of the individuals. This has also been used by advertisers to tailor ads etc. to fit an individual's preferences and influence the purchase decisions.

A user's preferences typically depend on the users behavior patterns, which are based on the users circumstances, life constraints as well as group involvements. Any changes in these characteristics will impact the preferences and activities of the user. Hence it will be advantageous to be able to understand life changes that impact the user at an early stage by changes in the identified and historically consistent behavior patterns.

It will hence be useful to have a method and system that can provide the capability to assess the change in behavior of a mobile device in use, with a reasonable probability of success through identification of changes in locations visited and group affiliation changes. It will be further useful to have a system and method capable of correlating these changes in behavior to change in life situations of the user of the mobile device. This ability for checking and verification of the changes in life situations of a user of mobile device will be very useful in predicting the preference characteristics of a user.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

Figure 1:
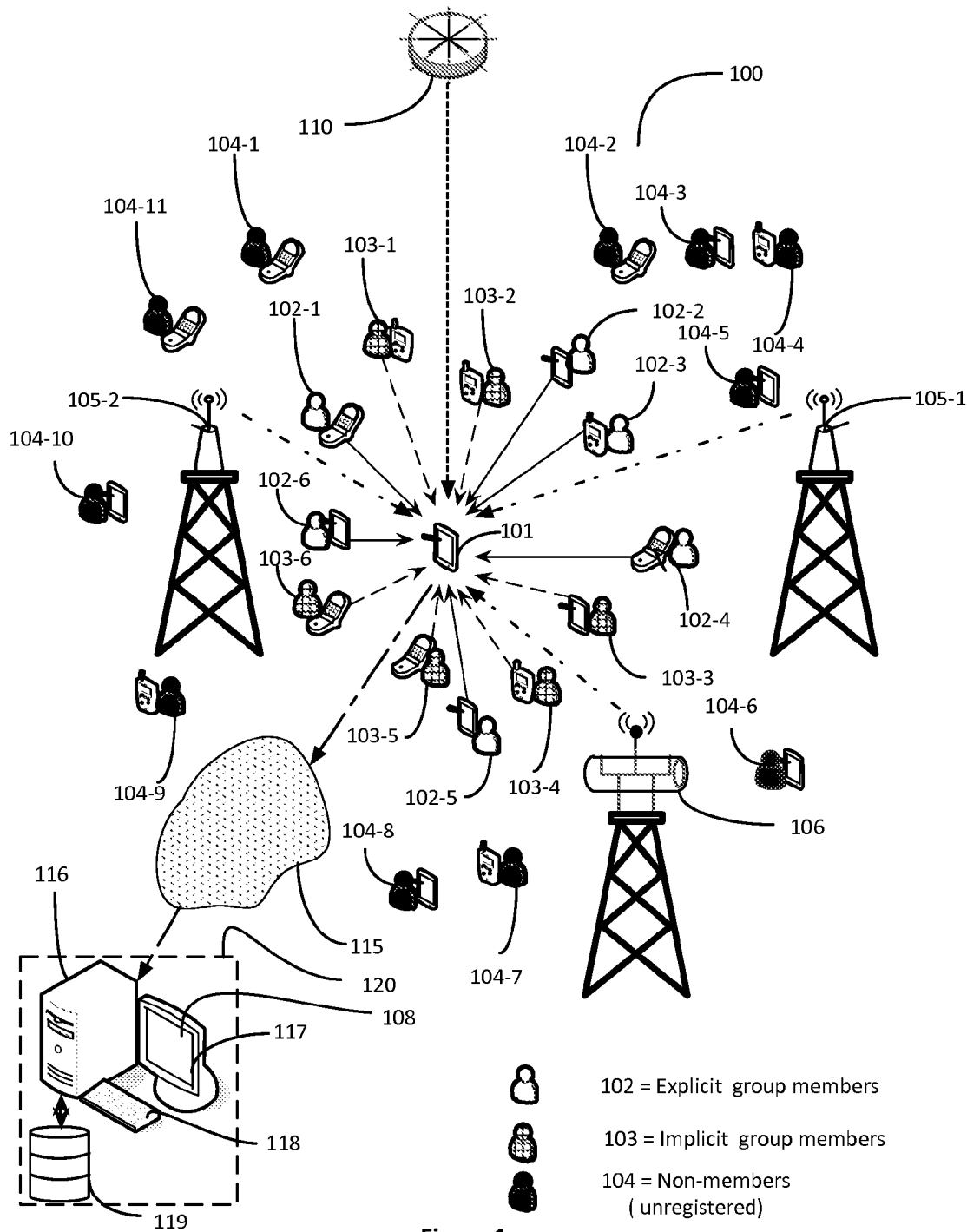
FIG. 1 is an exemplary block representation 100 of a system according to one embodiment of the invention.

In the following description, numerous specific details are set forth. However, it is understood that embodiments of the invention may be practiced without these specific details. In other instances, well-known circuits, structures, and techniques have not been shown to avoid obscuring the understanding of this description.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

In one embodiment, a method determines the normal use pattern of each registered mobile device versus other mobile devices within an explicit or implicit group of mobile devices using collected historic data. Life change identification occurs when a repetitive abnormal use pattern, or a change in a use pattern, is found. Location based changes as well as changes in clustering are used to determine change in use patterns of mobile devices. For example, a change in concentration of multiple mobile devices indicating a school, college, or work place change can indicate graduation from school and admission in college, or start of work. This clustering change is further supported by location identification to substantiate the change. As an example: a change of location of a family group of mobile devices indicating a move to a new home, etc. Confidence levels and thresholds may be further added.

In one embodiment, a method determines the normal behavior of mobile devices by analyzing the routine locations visited and the association the mobile device keeps in terms of explicit and implicit group members. The locations and group associations are analyzed and help determine the use pattern that dictates the behavior of the user. For example during week days a mobile device (associated to an individual user) may go from home, where the user device is in contact and association with member devices that are explicit group members (e.g., devices used by members of a family) to office or factory, at an identified location, where the user device will be in contact with and associate with explicit group member devices (e.g., members who form the individual's work group) and implicit group member devices (e.g., members of the office but not members of the individual's work group). Further, at the end of the day, the user may visit a club location where the associations may include explicit group member devices, implicit group member devices and unknown or unregistered devices. The information of routine movements and associations are stored in a historic database that is updated on a regular basis. When a change in behavior pattern occurs either in location or association, it can be a temporary change (e.g., which will revert back within a short time), in which case no behavioral and life change is indicated, or it can be a change in routine which indicates a life style change. As an example, the user, who has been working, goes back to school for studies. In this case, the location identification is different and the associations are different as well. The location identification changes to a school which may be identified from the location identification of the user device. New implicit associations (e.g., student body) will be made part of which may change to explicit associations (e.g., classmates and friends) over time. When a change in behavior occurs, such as a routine change, it can be an indication of life change for the user. Checking such behavior patterns can provide an early indication of the changes taking place in the life of the user. Moreover, clustering, that is having a number of registered mobile users, i.e. implicit group members, with similar interests in the same new location, can take place to determine behavioral patterns and changes in the preferences of mobile device user. Confidence levels and thresholds may be further added to verify the user preferences and further determine the impact of the life changes.

In some embodiments, the system and/or method uses the capability established for a group of pre-registered mobile devices registered with a tracking and monitoring server system (TMSS) to be tracked and monitored for location and associations. The location fixing is handled by any of the refined and available methods (e.g., GPS, triangulation, etc.). The normal locations and typical associations at these normal locations are collected for each of the registered mobile devices and saved in a historic location-association database (HLA-DB) included in the TMSS. In the HLA-DB, the associations and the locations may be linked. This HLA-DB is used to establish the normal and typical behavioral pattern of each of the mobile devices. Deviations from the normal behavioral pattern of a mobile device are considered abnormal behavior and an indication to the TMSS to monitor the activity of the mobile device more closely. If the behavior is recognized as a recurring change in pattern then the locations and associations at the new locations are evaluated to identify any possible change in life patterns.

FIG. 1 is an exemplary block representation 100 of a system according to one embodiment of the invention. Specifically, FIG. 1 is an exemplary block representation, 100, of the typical proximity detection and associations of a registered mobile device, 101, at a location. In FIG. 1, the mobile devices associated with explicit group members 102-1 to 102-$m$ (m>1) in combination with the mobile device 101 forms an explicit (association) group 102, and the group members 103-1 to 103-$p$ (p>1) may be an implicit group 103 that comprise all the registered members, registered with a server system, and are not included in the explicit groups associated with device 101 (such as group 102). A third group that is shown in FIG. 1 is the group comprising devices 104-1 to 104-$n$ (n>1) that are un registered devices that do not fall into any of the explicit or implicit groups associated with device 101. In one embodiment, the explicit group 102 may include the mobile device 101 and mobile devices associated with explicit group members 102-1 to 102-$m$ that are members of a social networking group that are being monitored and tracked by their location. For instance, the membership to these social networks include registration with one or more central servers as part of explicit groups, such as family group, friends group, extended family and friends group, sport and club groups etc. Each of these explicit groups comprises different set of members that confirm to differing group characteristics. Combinations of these explicit groups also make up an implicit group associated with device 101. Moreover, the combinations of these explicit and implicit groups, explicit group 102, implicit group 103 together also form an implicit groups of mobile devices that has common properties, such as registration with a common server, but are not linked by an explicit registration for monitoring and tracking. For instance, implicit groups can be as indicated all registered devices, all members of a club, etc. that have common properties but are not explicitly linked for monitoring and tracking.

The mobile device 101 and the mobile devices associated with groups including explicit group 102 and implicit group 103 are registered devices with a tracking and monitoring server that uses the available sensors on the registered mobile devices to fix their locations and monitor their associations with proximity sensing capability, using proximity sensors included in the mobile devices, and monitor other activities that are allowed/approved by the devices. According to one embodiment, the mobile device 101 has a proximity sensitivity radius such that the proximity information received by the TMSS from the mobile device 101 may include an identification of the proximate mobile devices. The typical location fixing capabilities used by the mobile devices include the GPS satellite 110, the cell towers 105-1, 105-2, and any Wi-Fi hotspots 106 whose location is known and that allow connections. The location and proximity information generated by the mobile device 101 is collected by the TMSS 120 over an Internet 115 or other available connection means for tracking and monitoring to the mobile device 101. Further this information is stored in a part of the memory 119 in the HLA-DB of the TMSS 120. The TMSS 120 typically comprise at least a server 116 with sufficient processing power to handle the processing of the collected data to track and monitor the registered group of devices 101, 102, 103 at least a memory 119 that comprise program storage memory and database memory, at least a display device 117 having a display screen 108, and at least an input output device 118.

The explicit group of devices 102-1 to 102-6 that are shown as being in the proximity of the mobile device 101 are part of an explicit group 102 of devices with the mobile device 101. The implicit group of devices 103-1 to 103-6 shown as being in the proximity of the mobile device 101 are part of implicit group 103 of registered devices due to the fact that they are part of the registered group of devices, but not part of the explicit group of devices. Each of these groups, although shown as a single group can be divided into multiple subgroups, each having its own characteristics. The group of devices 104-1 to 104-11 forms an un-registered and non-trackable group (e.g., cannot be tracked by the system) that is in the proximity of the mobile device 101 and sensed by the proximity sensor of mobile device 101. Typically, these three sets of device association groups 102, 103, 104 form the proximity group of association-group members that is sensed by the mobile device 101 in FIG. 1.

Figure 2:
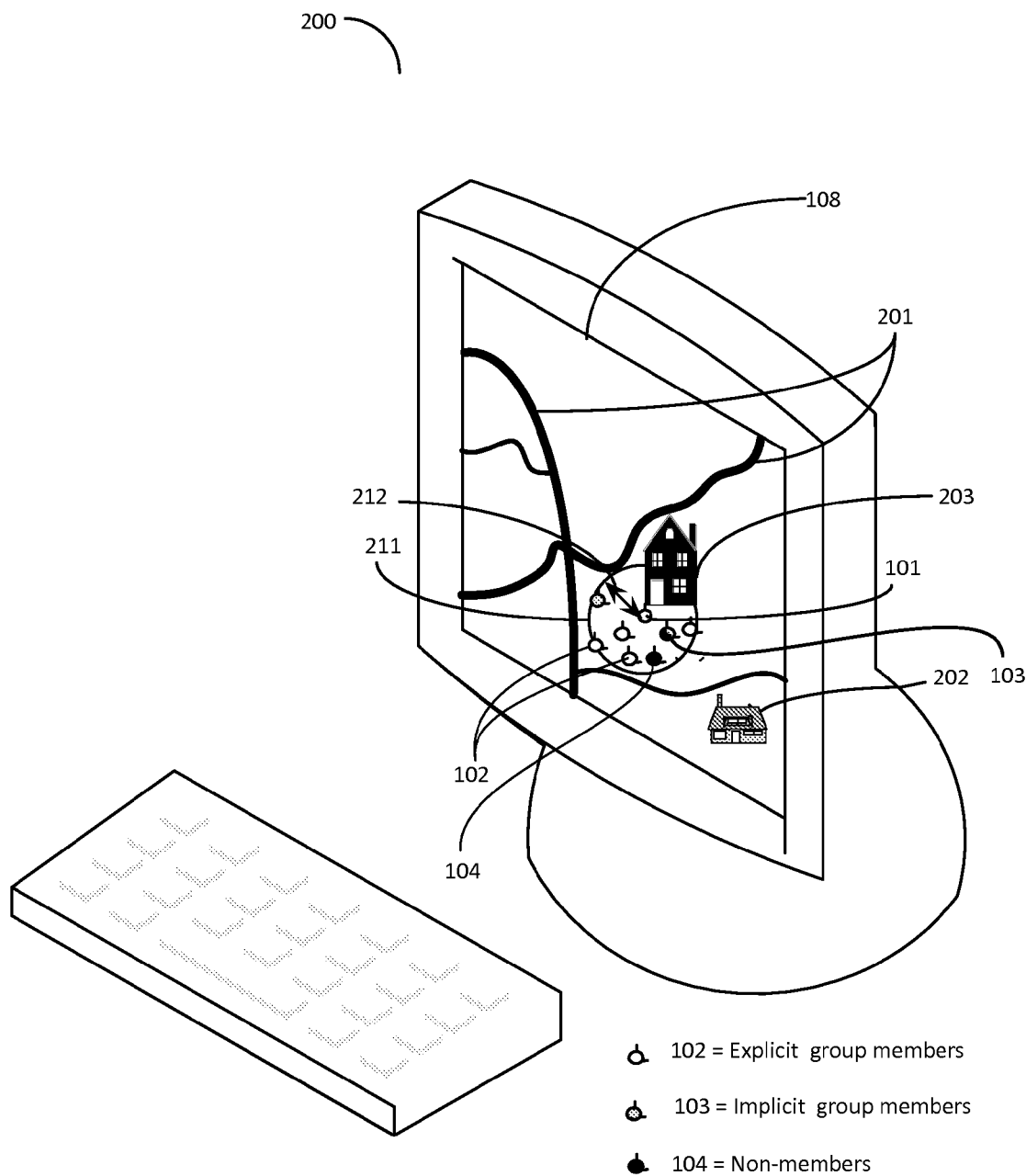
FIG. 2 is an exemplary view of the display 200 at a tracking and monitoring server of a mobile device according to an embodiment of the invention.

FIG. 2 is an exemplary view of the display 200 at a tracking and monitoring server of a mobile device according to an embodiment of the invention. Specifically, in FIG. 2, the exemplary view 200 on the display 108 of the TMSS 120 of a mobile device 101 at a typically frequented location 203 shows the explicit group members 102, and implicit group members 103, and non-registered members 104, that the specific communication device 101 is associating with or is in proximity of. The view 200 shows the location of the mobile device 101 on a map that shows the location of distinguishing items such as major roads 201 and locations of structures 202, 203, etc. The mobile device's 101 proximity sensor has a sensing radius 212 enabling it to sense any devices in the proximity falling within the sense limit 212 of the proximity sensors. This capability is used to define an association-group 211 for the mobile device 101. In the view 200, the association-group 211 of mobile device 101 comprise four explicit group members 102, two implicit group members 103 and one non-registered mobile device 104. In this embodiment of the invention, the TMSS 120 is able to collect the association-group 211 member information from the registered group of mobile devices using proximity sensing, at various frequented locations, and store the data in the in the HLA-DB in the memory 119 of the TMSS 120.

Figure 3:
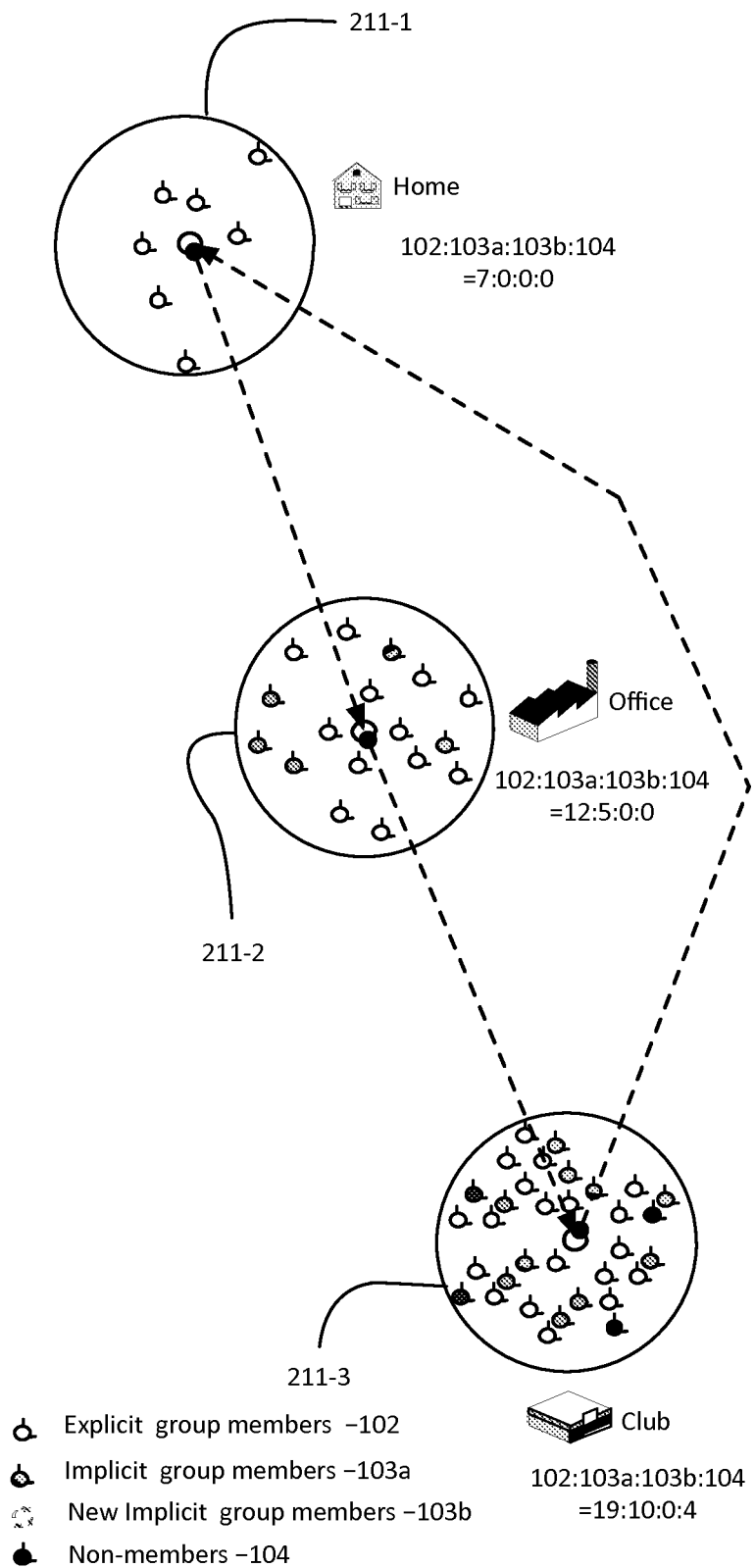
FIG. 3 is an exemplary block diagram 300 of a normal routine behavior pattern of locations and associations of a mobile device, supported by historic behavior according to an embodiment of the invention.

FIG. 3 is an exemplary block diagram 300 of a normal routine behavior pattern of locations and associations of a mobile device, supported by historic behavior according to an embodiment of the invention. Specifically, FIG. 3 is a block diagram representation 300 of a normal routine behavior pattern of locations and associations of a mobile device 101 at the locations, supported by historic behavior. Association-group 211 indicate members association identified at a location from the proximity sensing capability built into the mobile device 101. Using the data collected using the proximity sensor of the mobile device 101 of each of the groups 102, 103*a*, 103*b* the association-group 211 members for the mobile device 101 may be formed. Over a period of time, this data collected is used to generate the historic data of associations at each location frequented by the user of mobile device 101. This data is again saved in the HLA-DB in the memory 119 of the TMSS 120. The typical behavioral pattern may vary with days of the week etc., but an average or regular pattern can be established from the historic data of activity of the mobile device 101 saved in the HLA-DB. This behavior pattern will include the locations 211 frequented by the mobile device 101 and associations at these locations.

For instance, an exemplary list (or specified set of locations) for one day in consideration from HLA-DB is shown in FIG. 3 to include: Home 211-1, Office 211-2, and Club 211-3. If on one day, this specified set of locations, or a selection from a specified set of locations from HLA-DB stored in the memory 119 of the TMSS 120 are frequented by the mobile device 101, the frequented locations are considered normal. Similarly, if each of the groups 102, 103, 104 associating with the mobile device 101, at each of the above locations 211-1, 211-2, 211-3, remain same or within the set of parameters established by the historic data (e.g., the parameters may be defining the proportions and range for each type of association identified by the proximity sensor), the associations are considered typical.

Figure 4:
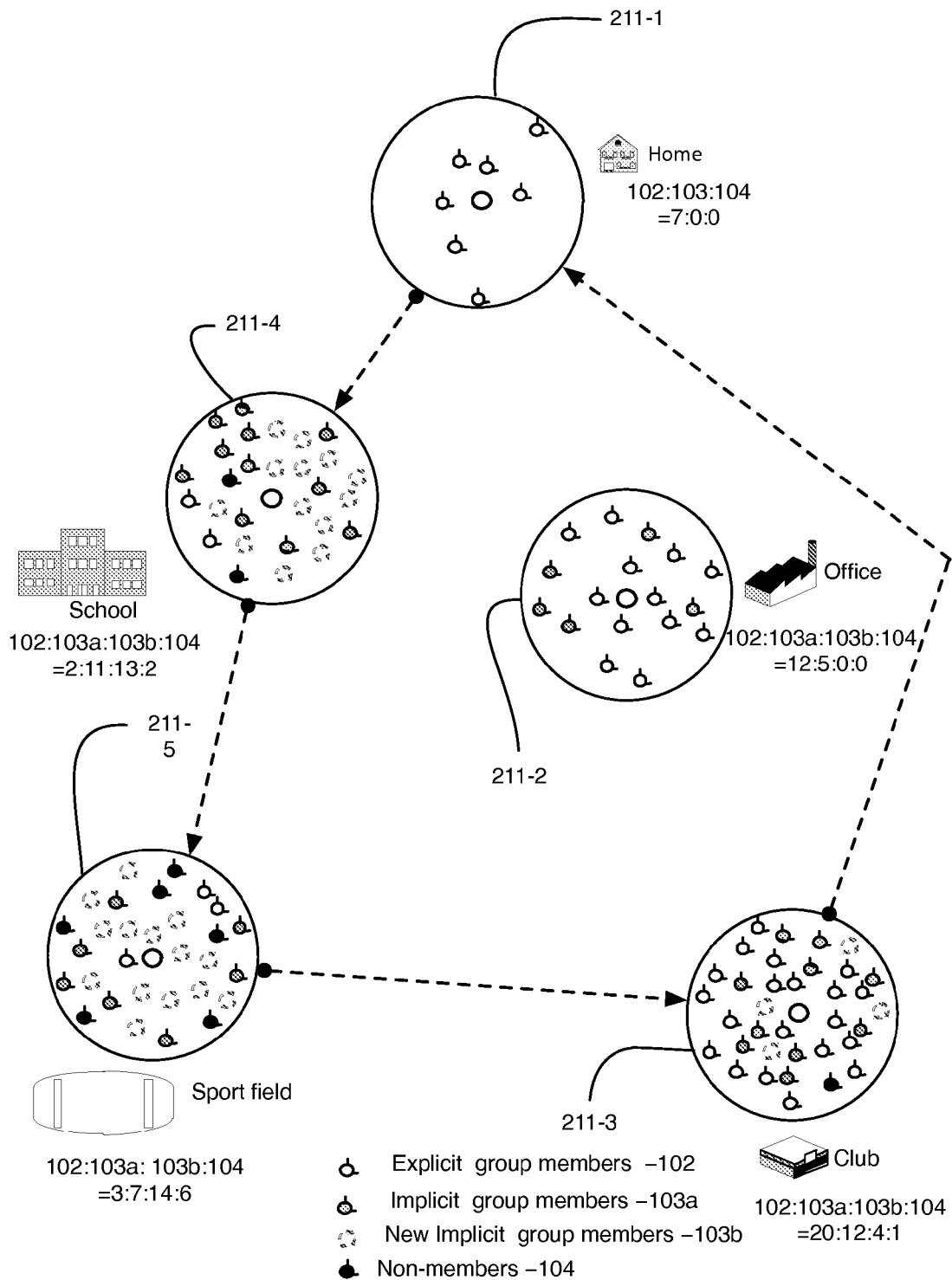
FIG. 4 is an exemplary block diagram 400 showing an example of an identifiable change in normal routine behavior pattern that indicates a possible life changes for the user of the mobile device according to an embodiment of the invention.

FIG. 4 is an exemplary block diagram 400 showing an example of an identifiable change in normal routine behavior pattern that indicates a possible life changes for the user of the mobile device according to an embodiment of the invention.

Specifically, FIG. 4 is a block diagram representation 400 of an example of identifiable change in behavior pattern leading to possible life change indication for the user of the mobile device 101. As can be seen in FIG. 4, the mobile device 101 is identified as changing the routine from an office location with its associations 211-2 (102:103*a*:103*b*:104=12: 5:0:0) to an identifiable school location where the association 211-4 (102:103*a*:103*b*:104=2:11:13:2) are also different and changes to include a large number of new implicit group members and possible unregistered members. The block diagram 400 further shows another new location (e.g., a sports field) where the associations are again different (102:103*a*: 103*b*:104=3:7:14:6). The club 211-3 and home 211-1 locations remain the same for the mobile device 101.

The deviation from historic data in terms of the locations and the associations are an indication for the TMSS to monitor the mobile device 101 further. The TMSS may signal to start monitoring the mobile device 101's behavior patterns further. If the behavioral pattern returns to the earlier pattern stored in the HLA-DB in the memory 119 of the TMSS 120, a decision is made by the processor included in the TMSS 120 that the change in behavior was an instance of aberration and not a change in life pattern. If, on the other hand, the behavior pattern is repeated continuously, that is indicative of a life change. The detail of the operation for identifying the life change from the behavior pattern recognition is described below with the help of the flow chart of FIG. 5.

The embodiments of the invention may be described as a process, which is usually depicted as a flowchart, a flow diagram, a structure diagram, or a block diagram.

Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 5:
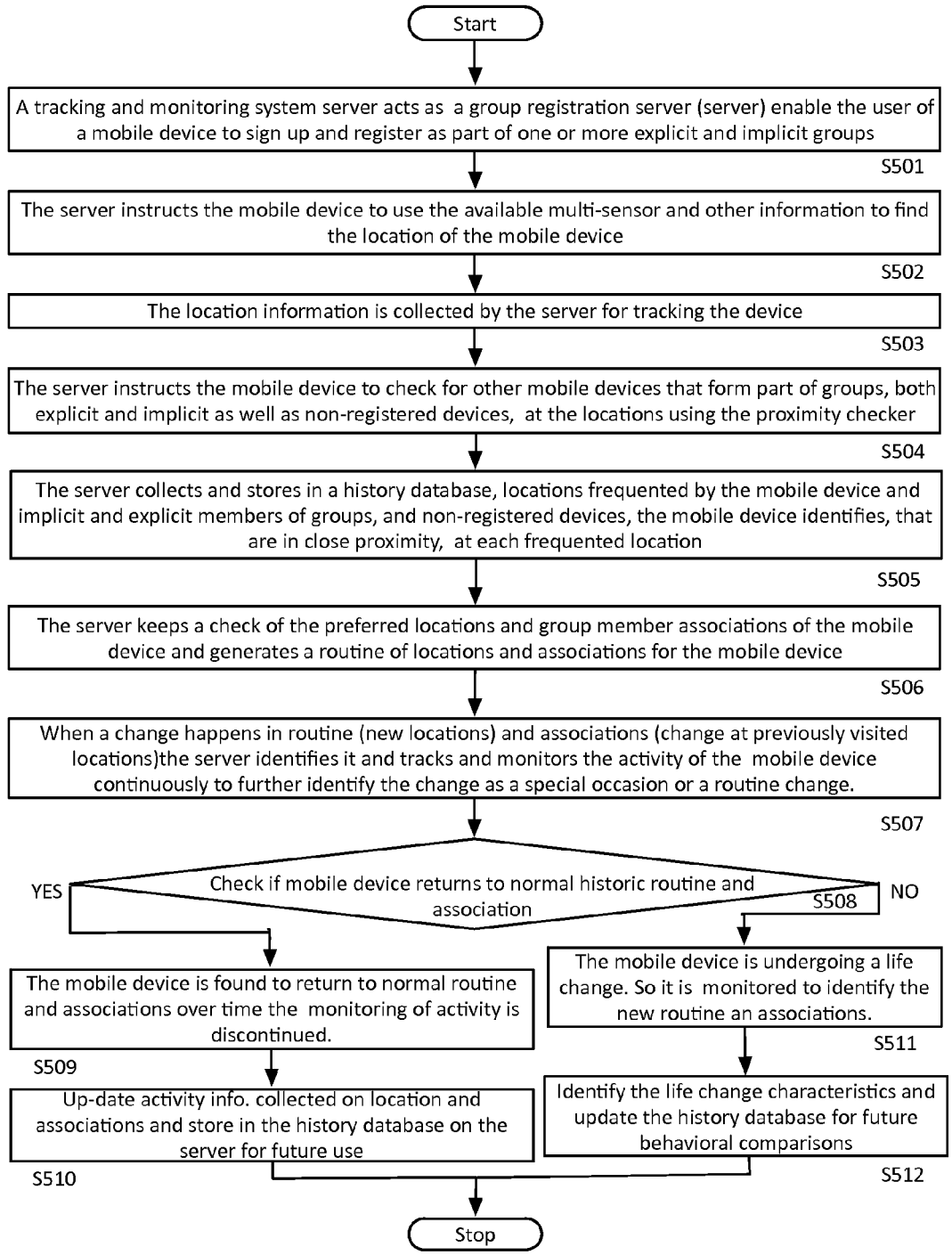
FIG. 5 is an exemplary flow chart 500 showing a method of assessing behavioral and change to determine life changes according to an embodiment of the invention.

FIG. 5 is an exemplary flow chart 500 showing a method of assessing behavioral and change to determine life changes according to an embodiment of the invention.

A TMSS server acts as a group registration server system ("server") to register the mobile devices as part of a multiplicity of explicit and implicit groups of mobile devices. This server system may comprise at least one of: local servers, servers implemented as distributed servers, and servers in the cloud. (Block S501).

The server instructs the mobile device to use the available multi-sensor and other information to find the location of the mobile device. The sensors can be any or all of GPS, triangulation using cell towers, known Wi-Fi connections etc. (Block S502).

The location information is sent to the TMSS. The information it is collected by the server, compiled, and used for tracking the device and monitoring its activities and behavior. (Block S503).

The server instructs the mobile device to check for other mobile devices that form part of groups, both explicit and implicit, as well as non-registered devices, at the locations using the proximity checker (e.g., proximity sensors). (Block S504).

The server collects and stores in a history database, HLA-DB, locations frequented by the mobile device and implicit and explicit members of groups, and the non-registered devices that the mobile device identifies to be in close proximity at each frequented location. (Block S505).

The server keeps a check of the preferred locations and group member associations of the mobile device, as identified by the proximity sensors of the mobile device. This information is used to generate an association-group of devices whose composition is recorded in the history database. The stored information is used to generate a behavioral and association pattern comprising routine of locations and associations for the mobile device with times, locations and association-group data. (Block S506).

When a change in the routine of the mobile device is recognized by the server, in terms of locations (e.g., new locations) and associations (e.g., change of association details at the newly visited locations), the server initiates increased tracking and monitoring of the activity of the mobile device, in a continuous fashion, to identify the change as either a persistent change or a short term change in the behavior routine of the mobile device. (Block S507).

The server continually checks for a predetermined period of time if the mobile device has returned to normal association and normal routine or continues with the modified routine and associations. (Block S508).

If a return to normal routine is recognized, the server discontinues the extended monitoring activity with respect to the mobile device and returns to the standard monitoring process. (Block S509).

Since the activity of the mobile device is recognized as normal (e.g., even with the changes), the collected information on location and association-groups are used to update the history database on the server for future use. (Block S510).

If the activity and association of the mobile device does not return to normal within reasonable time period (e.g., a predetermined period of time), the mobile device is considered as undergoing a life change. The TMSS then identifies the collected location and association data as a new routine relating to life change. (Block S511).

Once the life change is identified from the location and associations, the TMSS uses the collected new location information and new associations at the locations to identify and characterize the features and characteristics of the life change. The collected data is further used to update the historic database and identify the changes as the new behavioral routine for the mobile device for future behavioral change comparisons. In one embodiment, the life change of the user include changes in the user's the historical location data and historical proximity information (Block S512).

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration known to practitioners of the art. These modifications and alternate practices, though not explicitly described, are covered under the current application. The practice of the invention is further covered within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A method of determining a life change of a user of a first mobile device based on behavioral abnormality, the method comprising:
receiving, by a processor, a first location data and a first proximity information from the first mobile device, wherein the first proximity information includes an identification of mobile devices that are within a proximity sensitivity radius of the first mobile device;
displaying, by a display device, the first mobile device's location based on the first location data;
determining, by the processor, whether the first location data and the first proximity information are included in a historical location data and a historical proximity information, respectively, associated with the first mobile device, wherein the historical location data and the historical proximity information associated with the first mobile device is included in a historical database;
when the first location data and the first proximity information are not included in the historical location data and the historical proximity information, respectively, associated with the first mobile device,
monitoring by the processor the life change of the user of the first mobile device including: determining, by the processor, whether subsequent location data and subsequent proximity information received from the first mobile device over a predetermined period of time are included in the historical location data and the historical proximity information, respectively, associated with the first mobile device;
when the subsequent location data and the subsequent proximity information received from the first mobile device over the predetermined period of time are not included in the historical location data and the historical proximity information, respectively, associated with the first mobile device,
determining, by the processor, that the first location data and the first proximity information received from the first mobile device relate to the life change, wherein the life change of the user includes long-term change in the historical location data and the historical proximity information associated with the first mobile device, and
updating, by the processor, the historical database by storing the first location data and the first proximity information in the historical location data and the historical proximity information associated with the first mobile device.

2. The method of claim 1, further comprising:
signaling, by the processor, to discontinue monitoring the life change of the user of the first mobile device when subsequent location data and the subsequent proximity information received from the first mobile device over the predetermined period of time is included in the historical location data and the historical proximity information, respectively, associated with the first mobile device.

3. The method of claim 1, wherein the first location information includes a location of the first mobile device obtained using at least one of: GPS, and triangulation using cell towers and WiFi connections.

4. The method of claim 1, further comprising:
receiving, by a processor, location data and proximity information from each of a plurality of mobile devices, respectively, wherein the plurality of mobile devices includes the first mobile device.

5. The method of claim 4, further comprising:
storing, by the processor, the location data and proximity information from each of the plurality of mobile devices in the historical database in association with each of the plurality of mobile devices, respectively.

6. The method of claim 5, wherein, when subsequent proximity information received from the first mobile device over the predetermined period of time is not included in the historical location data and the historical proximity information, respectively, associated with the first mobile device, the method further comprising:

determining, by the processor, whether the location data and proximity information from each of the plurality of mobile devices are included in the historical location data and the historical proximity information associated with each of the plurality of mobile devices, respectively.

7. The method of claim 1, wherein the first proximity information includes the identification of mobile devices including at least one of (i) a mobile device included in an explicit group that includes the first mobile device, (ii) a mobile device included an implicit group that includes the first mobile device, and (iii) a mobile device that is not a member of the explicit group or the implicit group.

8. An apparatus for determining a life change of a user of a first mobile device based on behavioral abnormality, the apparatus comprising:

a historical database to store historical location data and historical proximity information associated with the first mobile device;

a processor coupled to the historical database, the processor to receive a first location data and a first proximity information from the first mobile device, wherein the first proximity information includes an identification of mobile devices that are within a proximity sensitivity radius of the first mobile device, to determine whether the first location data and the first proximity information are included in the historical location data and the historical proximity information, respectively, associated with the first mobile device, when the first location data and the first proximity information are not included in the historical location data and the historical proximity information, respectively, associated with the first mobile device, to monitor the life change of the user of the first mobile device including: to determine whether subsequent location data and subsequent proximity information received from the first mobile device over a predetermined period of time is included in the historical location data and the historical proximity information, respectively, associated with the first mobile device, when the subsequent location data and the subsequent proximity information received from the first mobile device over the predetermined period of time is not included in the historical location data and the historical proximity information, respectively, associated with the first mobile device, to determine that the first location data and the first proximity information received from the first mobile relate to the life change, wherein the life change of the user includes long-term change in the historical location data and the historical proximity information associated with the first mobile device; and to update the historical database by storing the first location data and the first proximity information in the historical location data and the historical proximity information associated with the first mobile device; and a display device coupled to the processor to display the first mobile device's location based on the first location data.

9. The apparatus of claim 8, wherein the processor further to signal to discontinue monitoring the life change of the user of the first mobile device when the subsequent location data and the subsequent proximity information received from the first mobile device over the predetermined period of time is included in the historical location data and the historical proximity information, respectively, associated with the first mobile device.

10. The apparatus of claim 8, wherein the first location information includes a location of the first mobile device obtained using at least one of: GPS, and triangulation using cell towers and WiFi connections.

11. The apparatus of claim 8, wherein the processor further to receive location data and proximity information from each of a plurality of mobile devices, respectively, wherein the plurality of mobile devices includes the first mobile device.

12. The apparatus of claim 11, wherein the processor further to store the location data and proximity information from each of the plurality of mobile devices in the historical database in association with each of the plurality of mobile devices, respectively.

13. The apparatus of claim 12, wherein, when subsequent proximity information received from the first mobile device over the predetermined period of time is not included in the historical location data and the historical proximity information, respectively, associated with the first mobile device, the processor further to determine whether the location data and proximity information from each of the plurality of mobile devices are included in the historical location data and the historical proximity information associated with each of the plurality of mobile devices, respectively.

14. The apparatus of claim 8, wherein the first proximity information includes the identification of mobile devices including at least one of (i) a mobile device included in an explicit group that includes the first mobile device, (ii) a mobile device included an implicit group that includes the first mobile device, and (iii) a mobile device that is not a member of the explicit group or the implicit group.

15. A non-transitory computer-readable medium having stored thereon instructions that, when executed by a processor, causes the processor to perform a method of determining a life change of a user of a first mobile device based on behavioral abnormality, the method comprising:

receiving a first location data and a first proximity information from the first mobile device, wherein the first proximity information includes an identification of mobile devices that are within a proximity sensitivity radius of the first mobile device;

displaying, by a display device, the first mobile device's location based on the first location data;

determining whether the first location data and the first proximity information are included in a historical location data and a historical proximity information, respectively, associated with the first mobile device, wherein the historical location data and the historical proximity information associated with the first mobile device are included in a historical database;

when the first location data and the first proximity information are not included in the historical location data and the historical proximity information, respectively, associated with the first mobile device, monitoring by the processor the life change of the user of the first mobile device including: determining whether subsequent location data and subsequent proximity information received from the first mobile device over a predetermined period of time is included in the historical location data and the historical proximity information, respectively, associated with the first mobile device;

when the subsequent location data and the subsequent proximity information received from the first mobile device over the predetermined period of time is not included in the historical location data and the historical proximity information, respectively, associated with the first mobile device, determining that the first location data and the first proximity information received from the first mobile device relate to the life change, wherein the life change of the user includes long-term change in the historical location data and the historical proximity information associated with the first mobile device, and updating the historical database by storing the first location data and the first proximity information in the historical location data and the historical proximity information associated with the first mobile device.

16. The non-transitory computer-readable medium of claim 15, having stored thereon instructions that, when executed by a processor, causes the processor to perform the method further comprising:

signaling to discontinue monitoring the life change of the user of the first mobile device when subsequent proximity information received from the first mobile device over the predetermined period of time are included in the historical location data and the historical proximity information, respectively, associated with the first mobile device.

17. The non-transitory computer-readable medium of claim 15, wherein the first location information includes a location of the first mobile device obtained using at least one of: GPS, and triangulation using cell towers and WiFi connections.

18. The non-transitory computer-readable medium of claim 15, having stored thereon instructions that, when executed by a processor, causes the processor to perform the method further comprising:

storing location data and proximity information received from each of the plurality of mobile devices in the historical database in association with each of the plurality of mobile devices, respectively.

19. The non-transitory computer-readable medium of claim 18, wherein, when subsequent proximity information received from the first mobile device over the predetermined period of time is not included in the historical location data and the historical proximity information, respectively, associated with the first mobile device, the method further comprising:

determining, by the processor, whether the location data and proximity information from each of the plurality of mobile devices are included in the historical location data and the historical proximity information associated with each of the plurality of mobile devices, respectively.

20. The non-transitory computer-readable medium of claim 15, wherein the first proximity information includes the identification of mobile devices including at least one of (i) a mobile device included in an explicit group that includes the first mobile device, (ii) a mobile device included an implicit group that includes the first mobile device, and (iii) a mobile device that is not a member of the explicit group or the implicit group.

* * * * *